United States Patent [19]

Pierce et al.

[11] Patent Number: 4,730,293

[45] Date of Patent: Mar. 8, 1988

[54] DUAL BEAM OPTICAL DATA SYSTEM

[75] Inventors: Gerald A. Pierce, Redwood City; Louis F. Schaefer, Palo Alto; Norman A. Peppers, Belmont; William F. Mullen, San Bruno, all of Calif.

[73] Assignee: Drexler Technology Corporation, Mountain View, Calif.

[21] Appl. No.: 907,956

[22] Filed: Sep. 15, 1986

[51] Int. Cl.⁴ .............................................. G11B 7/00
[52] U.S. Cl. .................... 369/44; 235/462; 235/487; 235/454
[58] Field of Search ............... 235/462, 487, 454; 369/44

[56] References Cited

U.S. PATENT DOCUMENTS

| | | | |
|---|---|---|---|
| 4,290,122 | 9/1981 | Bates et al. | 365/234 |
| 4,360,728 | 11/1982 | Drexler | 235/462 |
| 4,425,636 | 1/1984 | Musha | 369/44 |
| 4,500,777 | 2/1985 | Drexler | 235/487 |
| 4,542,288 | 9/1985 | Drexler | 235/487 |
| 4,544,835 | 10/1985 | Drexler | 235/487 |

Primary Examiner—Harold I. Pitts
Attorney, Agent, or Firm—Thomas Schneck

[57] ABSTRACT

An optical data reading and writing system in which a laser beam records data spots on a medium and a wide light beam is used for simultaneously reading the data spots and prerecorded information. The laser beam records spots of a uniform size which is less than about ten micrometers. The wide beam which may be emitted by an LED illuminates a substantially larger area of the medium than the laser beam. Prerecorded information, if present, may include parallel track lines, the wide beam illuminating adjacent pairs of track lines in addition to the data spots and prerecorded clock spots in data tracks between the track lines. Multiple data paths may be present between track lines, which may then be read simultaneously by a photodetector. The photodetector may have a plurality of detector elements which have apertures such that simultaneously illuminated data spots are distinguished.

22 Claims, 10 Drawing Figures

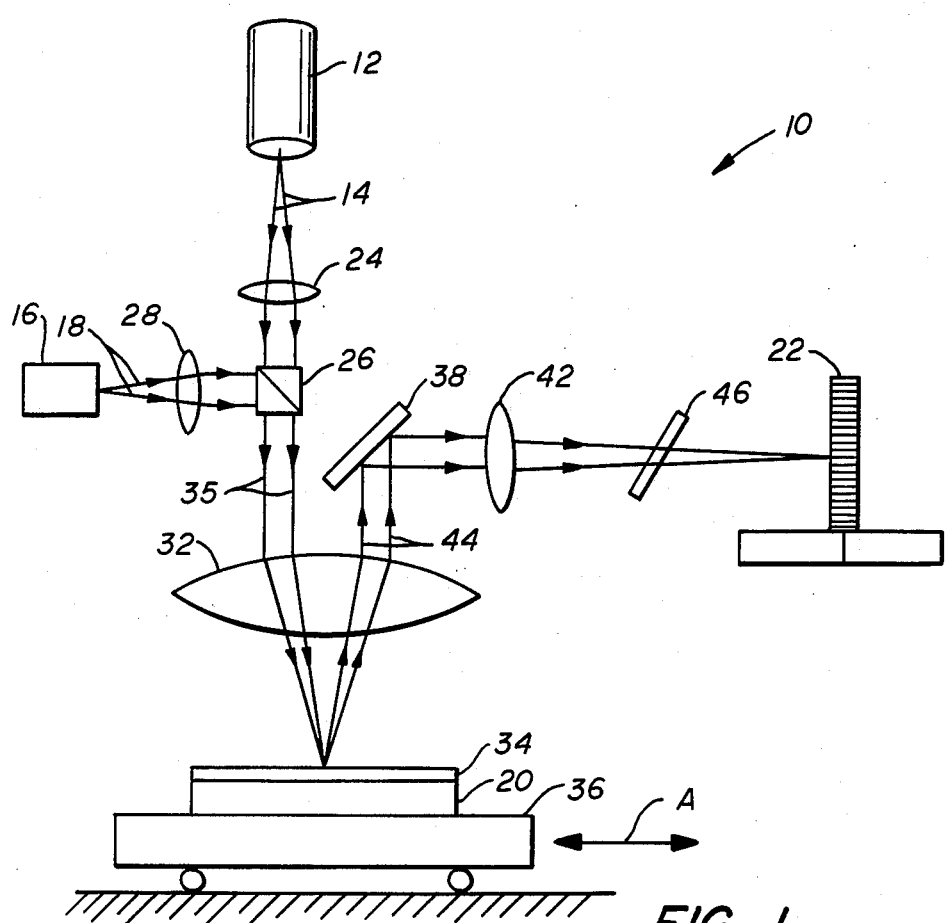
FIG._1.
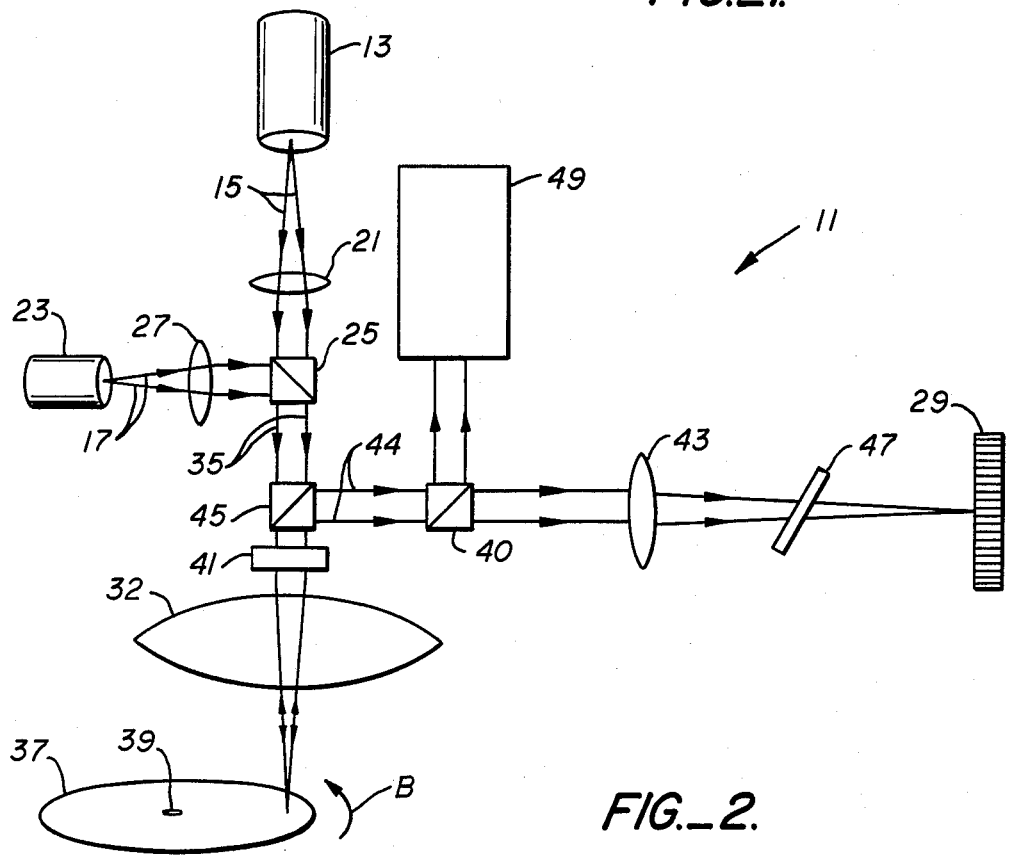
FIG._2.

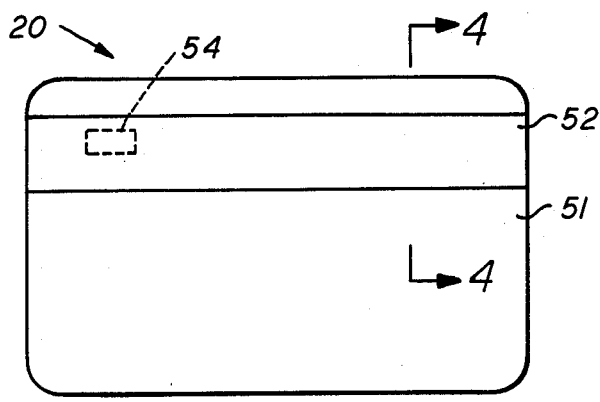
FIG._3.
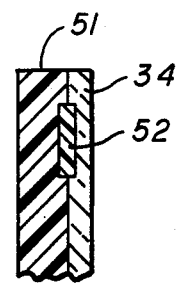
FIG._4.
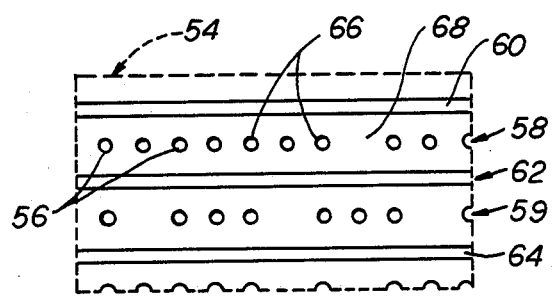
FIG._5A.
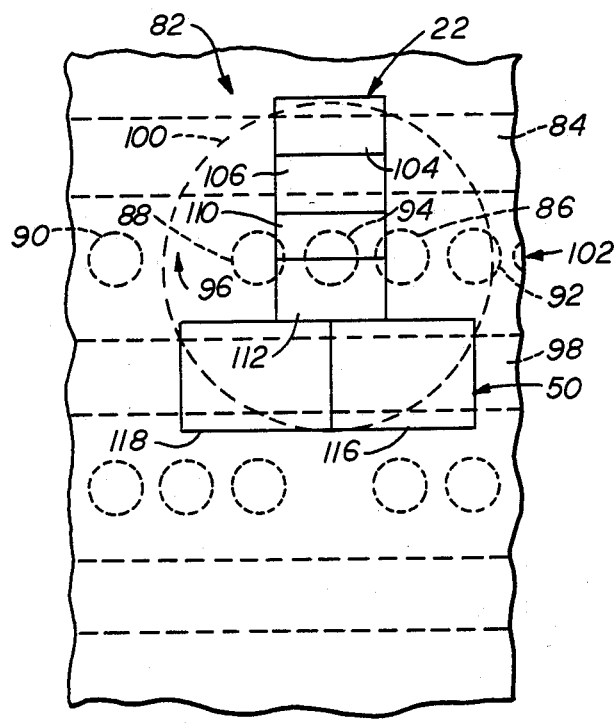
FIG._6.

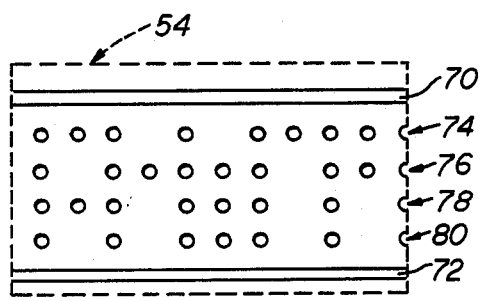
FIG._5B.
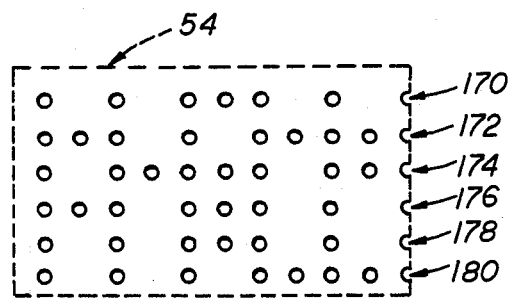
FIG._5C.
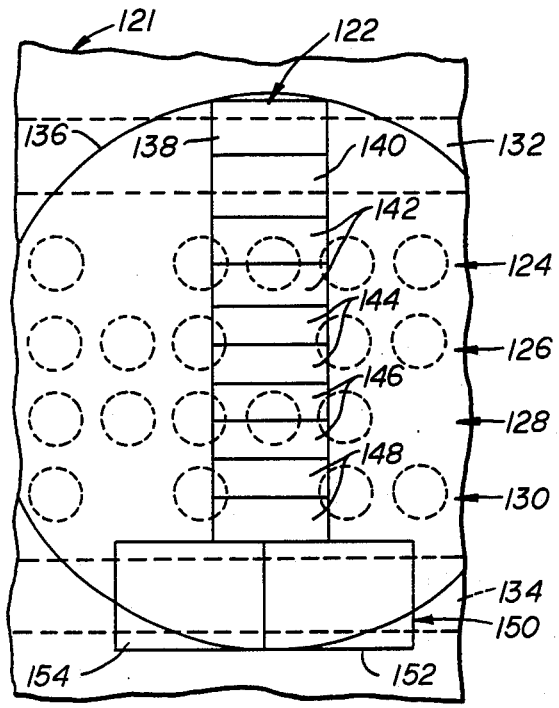
FIG._7
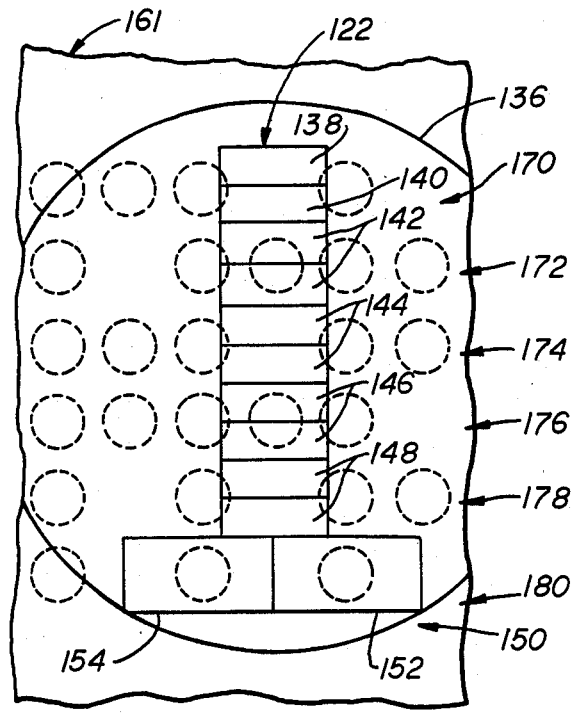
FIG._8

DUAL BEAM OPTICAL DATA SYSTEM

DESCRIPTION

1. Technical Field

The present invention relates to systems for reading and writing of data on optical data storage media.

2. Background Art

Prior optical data reader-writers typically record by directing a scanning beam of laser light onto an optical data storage medium thereby producing spots representing bits of data. The spots have a reflectivity, transmissivity or other optical characteristic which contrasts with that of the background medium. Prior reader-writers typically read the data by directing a scanning beam of lower intensity laser light onto the medium, where it is deflected, scattered or transmitted by the spots to one or more photodetectors. Generally, the same laser is used for both writing and reading. Prerecorded marks may be present on the medium to allow the system to properly track, clock and focus on the spots.

U.S. Pat. Nos. 4,360,728, 4,500,777, 4,542,288 and 4,544,835 to Drexler disclose such data reading and writing systems for use with optical data storage media disposed on cards. U.S. Pat. No. 4,284,716 to Drexler et al. discloses one type of laser recordable medium suitable for such systems.

In U.S. Pat. No. 4,290,122 to Bates et al., a first laser emits a beam for writing, while a second laser supplies a beam which is focused on a diffraction grating. The grating diffracts the beam to provide a plurality of essentially equal intensity, spaced apart read beams and a pair of radial tracking and focus control beams. The read beams illuminate different parallel data tracks which are read simultaneously by a detector array.

Prior optical data reader-writer systems are capable of storing data on optical storage media at a much greater density than magnetic systems and media. However, when reading this data the system is prone to error due to alignment problems between the laser light source, the data spot being read and the photodetector. Any misalignment may cause an error in the reading of data, necessitating error checking and correcting methods and circuitry. Typically, such error checking involves reading the data more than once to obtain a correct read, thereby reducing the overall speed of the system. The problem may be compounded by misalignment of multiple laser beams and detectors reading prerecorded marks for tracking, clocking or focusing at the same time as the data spots or plural tracks of data spots are read.

It is an object of the present invention to produce an optical data reading and writing system in which misalignment and errors during reading of data are reduced without reducing the speed of the system.

DISCLOSURE OF THE INVENTION

The above object has been met with a system for reading and writing data on optical data storage media in which a modulated laser beam records data spots on the medium and a second independent light source with a second beam illuminates a substantially larger area of the medium for simultaneously reading with a single beam both prerecorded information, such as servo track information, and data spots. The second light source is preferably an LED or light emitting diode. A photodetector having a plurality of detector elements reads the prerecorded information and data spots from the illuminated area. Some of the detector elements are adapted for reading data spots, each of these elements having an effective aperture such that the element receives light from and reads at most one data spot. More than one element may read a particular data spot. Other detector elements are adapted for reading prerecorded information, such as track lines and clock marks, on the medium.

The data storage medium is typically disposed on a card. Data spots on the card are aligned in spaced apart parallel data paths. Track lines are parallel to the data paths for providing the tracking functions. Clock and data marks in the form of prerecorded spots may be disposed in the data paths. Preferably, more than one data path is located between adjacent pairs of track lines.

The system of the present invention has reduced alignment problems because the illuminating beam is large and need not match up perfectly with the data spots and the detector. Further, multiple beams are not needed for reading data spots, track lines and clock marks, since the wide beam provides simultaneous illumination of both prerecorded information and data spots. An added advantage is that more than one data path can be illuminated and thus read at the same time, increasing the read speed by as much as fourfold.

BRIEF DESCRIPTION OF THE DRAWINGS

FIG. 1 is a plan view of a first embodiment of the system of the present invention.

FIG. 2. is a plan view of a second embodiment of the system of the present invention.

FIG. 3 is a top plan view of a data card used with the system of FIG. 1.

FIG. 4 is a sectional view, taken along the lines 4—4 in FIG. 3

FIGS. 5a, 5b, and 5c are enlarged plan views of a small portion of the card in FIG. 3.

FIG. 6 is a plan view of a detector in the system of FIG. 1 superimposed on a phantom image of the card of FIG. 5a.

FIG. 7 is a plan view of an alternate detector in the system of FIG. 1 superimposed on a phantom image of the card of Fig. 5b.

FIG. 8 is a plan view of the detector of FIG. 7 superimposed on a phantom image of the card of FIG. 5c.

BEST MODE OF CARRYING OUT THE INVENTION

With reference to FIG. 1, an optical data reading and writing system, in the present instance a data card reader-writer 10, comprises a laser 12 capable of emitting a modulated laser beam 14, a second light source 16 emitting a second beam 18, optical elements for directing beams 14 and 18 to an optical storage medium, here disposed on a card 20, and at least one detector 22 for reading data on card 20.

Laser 12 is used only for writing data spots on card 20 and during data reading is kept below the threshold for writing on the medium. Beam 14 should, when writing, deliver sufficient laser pulse energy to the surface of the recording material to create spots. Typically, 5–20 milliwatts is required, depending on the recording material. A 20 milliwatt semiconductor laser, focussed to a five micron beam size, records at temperatures of about 200 C. and is capable of creating spots in less than 25 microseconds. Other laser beams, focussed to one to ten micron beam diameters, are also capable of recording spots on optical storage media. The wavelength of the laser should be compatible with the recording material.

Second light source 16 is preferably a light emitting diode (LED), and is used for reading data spots on card 20 and for tracking, clocking and focussing. LED 16 emits low intensity beam 18 during both reading and writing. Second light source 16 may also be a defocussed laser 23, as shown in FIG. 2.

Laser beam 14 is directed through a lens 24 to a polarizing beam splitter 26. Beam 18 from LED 16 is directed through a lens 28 to beamsplitter 26. Beams 14 and 18 entering beamsplitter 26 emerge as a combined beam sharing a slightly displaced optical axis 35. Combined beam on axis 35, which beam is made up of low intensity beam 18 and laser beam 14 at high power during data writing and low or zero power during data reading, is directed through a focusing lens 32 onto card 20. Card 20 is typically provided with a transparent scratch resistant protective coating 34 disposed on the data storage medium on the card. Lens 32 has a focal length so as to bring laser beam 14 to a narrow spot on the order of one to ten micrometers in diameter on card 20. Lens 32 typically has a three to four millimeter focal length. Beam 18 does not focus to a narrow spot but rather illuminates a substantially larger area of the medium on card 20 than beam 14. Typically, beam 18 illuminates an area ranging from a 10 micrometer diameter up to a 60 micrometer diameter. Beam 18 may be elliptical.

Card 20 is supported on a platform 36 movable in a direction indicated by arrow A. Motion of platform 36 provides course scanning in a longitudinal direction along data tracks on the medium on card 20. The system 10 is movable in a direction in and out of the page for course scanning in a lateral direction across data tracks. Fine scanning may be provided by moving one or more optical elements in system 10, such as lens 32. Alternatively, data may be recorded onto and read from a disk 37, shown in FIG. 2, rotatable in a direction indicated by arrow B.

Light illuminating the medium on card 20 is reflected from the medium and scattered or absorbed by data spots or prerecorded information on the medium. Light scattered or absorbed from the spots contrasts with the light reflected from the surrounding field where no spots exist. The light is then directed to at least one detector 22 by lens 32, a mirror 38, and a lens 42. Lens 32 is shown off-center with respect to optical path 35 so that reflected light returns through lens 32 along a separate optical path 44. This allows a non-polarization sensitive tracking and focussing system to be used to thereby reduce the cost of the medium. Alternatively, lens 32 may be centered with respect to optical axis 35, as shown in FIG. 2, with reflected light being directed along optical path 44 to detector 29 by a quarterwave plate 41 and beamsplitter 45.

The focal length of lens 42 is determined by the size and configuration of detector 22, and vice versa. The spot on the media should be imaged onto detector elements of detector 22. The magnification of a spot is determined by the focal lengths of lenses 32 and 42. Preferably, the focal length of lens 42 is on the order of 10 mm, but lenses have been used with a focal length as long as 360 mm. In that case, a plurality of turning mirrors, represented by mirror 46, are generally provided to fold the optical path 44 into a compact structure. No such turning mirrors 46 are required for lenses 42 having a focal length of about 10 mm.

With reference to FIG. 2, an optical data reading and writing system 11 illustrates alternate features of the system 10 of FIG. 1. A defocused laser 23 may be used as the second light source in place of an LED. Laser 23 emits a beam 17 which is generally brighter than an LED, but still below the threshold for writing data on the medium. Thus, laser 23 has an advantage that detectors 29 and 50 need not be as sensitive as detector 22 in FIG. 1. Typically, laser 23 does not illuminate as large an area of the medium on disk 37 as an LED, so alignment of beam 17 with data spots on disk 37 and with detectors 29 and 49 is more critical for defocussed laser 23 than for LED 16 of FIG. 1.

Laser 13 is a first light source, generally identical to laser 12 in FIG. 1, and emits a beam 15. Beam 15 is directed through a lens 21 to a polarizing beamsplitter 25. Beam 17 is also directed through a lens 27 to beamsplitter 25 where beam 15 and 17 are combined and emerge on a common optical axis 35. The combined beams then pass through a polarizing beamsplitter 45 and lens 32 to a recording medium on disk 37. Disk 37 is turnable about its center 39 in a direction indicated by arrow B. Disk 37 may also be turnable in the opposite direction.

Lens 32 is centered with respect to optical axis 35, instead of off-center as in FIG. 1. Light shined on disk 37 returns along the same path 35 as the incident beam and is then directed along optical path 44 toward detectors 29 and 49 by beam splitter 45. A higher data density may be recorded and resolved with this lens-centered arrangement than with the off-center arrangement in FIG. 1.

In FIG. 2, a beamsplitter 40 in the optical path 44 between beamsplitter 45 and lens 43 directs part of the reflected light to a second photodetector 49, and part of the light through a lens 43 to a first photodetector 29. Detector 49 is used for autofocus, and may be any of the detectors used for focussing which are known in the art. Detector 29 reads data by detecting light reflected, less scattering and absorption, from the medium of disk 37. Except where noted, detector 29 is like detector 22 of FIG. 1 described in more detail below.

In FIGS. 3 and 4, a data card 20 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 51 is a dielectric, usually a plastic material such as polyvinyl chloride or similar material. Polycarbonate plastic is preferred.

The surface finish of the base should have low specular reflectivity, preferably less than 10%. Base 51 carries strip 52. The strip is about 15 millimeters wide and extends the length of the card. Alternatively, the strip may have other sizes and orientations. The strip is relatively thin, approximately 100–500 microns, although this is not critical. The strip may be applied to the card by any convenient method which achieves flatness. The strip is adhered to the card with an adhesive and covered by a transparent laminating sheet 34 which serves to keep strip 52 flat, as well as protecting the strip from dust and scratches. Sheet 34 is a thin, transparent plastic sheet laminating material or a coating, such as a transparent lacquer. Sheet 34 is typically about 380 micrometers thick. The material is preferably made of polycarbonate plastic.

The opposite side of base 51 may have user identification indicia embossed on the surface of the card. Other indicia such as card expiration data, card number and the like may be optionally provided.

The high resolution laser recording material which forms strip 52 or which coats disk 37 in FIG. 2 may be any of the reflective recording materials which have been developed for use as optical disks, so long as the materials can be formed on thin substrates. Direct-read-after-write (DRAW) materials are easier to use with the data recording systems in FIGS. 1 and 2, since the detector 22 or 29 follows the write beam 14 or 15, facilitating checking of data recording. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, In, Sn, Cu, Al, Pt, Au, Rh, As, Sb, Ge, Ga. Materials which are preferred are those having high reflectivity and low melting point, particularly Cd, Sn, Tl, In, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,756, 4,269,917, 4,284,716, and 4,312,938, all assigned to the assignee of the present invention.

The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast data bits with the read/write system with which it is used.

The material should not lose data when subjected to temperatures of about 180 F. (82 C.) for long periods. The material should also be capable of recording at speeds of at least several thousand bits/sec. This generally precludes the use of materials that require long heating times or that rely on slow chemical reactions in the presence of heat, which may permit recording of only a few bits/sec. A large number of highly reflective laser recording materials have been used for optical data disk applications.

Data is recorded by forming spots in the surrounding field of the reflective layer itself, thereby altering the reflectivity in the data spot. Data is read by detecting the optical reflective contrast between the surrounding reflective field of unrecorded areas and the recorded spots.

Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

With reference to FIG. 5a, a magnified view of laser writing on the laser recording material strip 52 may be seen. The dashed line 54 corresponds to the dashed line 54 in FIG. 3. Strip 52 has laser recorded data spots 56 and clock spots 66, and prerecorded information thereon. Data spots 56 and clock spots 66 are aligned in spaced apart parallel data paths 58 and 59. Prerecorded information comprises reference position information, such as a plurality of parallel tracking lines 60, 62 and 64. Such information is used to generate position error signals used as feedback in motor control. Data may also be recorded on the prerecorded tracking lines. Program instructions may also be prerecorded for the system to record and read data at particular locations. Each of the various industries, that is, medical, personal, financial and insurance, has formats specific to its particular needs. U.S. Pat. No. 4,304,848 describes how formatting may be done photographically. Formatting may also be done using laser recording of the tracking lines 60, 62 and 64, clock spots 66 and other prerecorded information. Alternatively, preformatted tracking lines 60, 62 and 64 may be absent, as in FIG. 5c, and laser recorded data spots 56 used for tracking.

In FIG. 5a, laser recorded or preformatted clock spots 66 are equally spaced in data track 58. Laser recorded or preformatted data spots 56 are located in data path 58 between clock spots 66. Presence of a data spot 56 between any two clock spots may be used to indicate a 1 bit, while absence of a data spot, such as in vacant area 68, may be used to indicate a 0 bit. Other encoding schemes and formats may also be used. For instance, timing marks such as clock spots 66 may be located on a separate clock track, or may be integrated into the track lines. FIG. 5a shows only one data track 58 between a pair of adjacent track lines 60 and 62. Likewise, data path 59 is the only data path between servo track lines 62 and 64. Track lines are spaced 2 to 30 micrometers apart depending on the laser recorded spot size. For a 5 micron diameter laser recorded spot, servo track lines are typically spaced 15 microns apart. More than one data path may be disposed between adjacent servo track lines when the track lines are spaced further apart. In FIG. 5b, track lines 70 and 72 are spaced about ten laser spot diameters apart with four data paths 74, 76, 78 and 80 therebetween. In FIG. 5c, track lines are completely absent, and only data paths 170, 172, 174, 176, 178 and 180 are shown.

With reference to FIG. 6, an image 82 of part of the medium on card 20 is focused on detectors 22 and 500 Detectors 22 and 50 are shown as being connected as far as the image 82 is concerned, but need not be physically connected. Detector 22 reads a servo track line 84 for tracking and a data path 102 containing laser recorded or preformatted clock spots 86, 88 and 90 sequentially for timing reference, and laser recorded or preformatted data spots 92 and 94. Vacant area 96 between clock spots 88 and 90 is also read as a data bit. Detector 50 reads a track line 98 for focussing, as will be explained below. The focussing detector may, alternatively, follow a data track, as seen in FIG. 8. Detector 29 in FIG. 2 is like detector 22 without focussing detector 50. Instead, a separate focussing detector 49 is provided.

A wide beam illuminates a large area of the medium. At least the area 100, defined by a dashed line circle, including portions of track lines 84 and 98 and data path 102 therebetween is illuminated, so that light is reflected or scattered from the medium for reading by detectors 22 and 50. Detectors 22 and 50 are typically multiple element linear arrays of photodiodes. Detector 22 in FIG. 6, for example, comprises detector elements 104, 106, 110 and 112.

Detector elements 104 and 106 both detect light from the medium reflected, scattered, absorbed or otherwise modified by track line 84. Electrical signals from elements 104 and 106 are subtracted to produce a track error signal for feedback and servo motor control. When detector 22 is "on track", detector elements 104 and 106 detect an equal amount of light thereby producing a zero amplitude error signal. When detector 22 is "off track", one or the other of detector elements 104 and 106 will receive a greater amount of light thereby producing an error signal indicative of the amount and direction of mistracking.

Detector elements 110 and 112 detect light reflected, less the light scattered or absorbed from data track 102. Electrical signals from elements 110 and 112 are added to produce a data and clock signal. Alternatively, a single detector element may be used to detect data track 102. As the medium is scanned, different spots on the data track are sequentially read.

Detector 50 comprises detector elements 116 and 118. Each detector element may comprise either a single photodiode or a composite of several photodiodes whose electrical signals are added together. Detector elements 116 and 118 both detect light reflected, less the light scattered or absorbed, from tracking line 98. Electrical signals from elements 116 and 118 are subtracted to produce a focus error signal for autofocus feedback and control. As the system in FIG. 1, with off-center lens 32, is brought in and out of focus, the image of the illuminated portion of tracking line 98 shifts from one detector element to the other. When the system is "in focus", elements 116 and 118 receive an equal amount of light thereby producing a zero amplitude error signal. When the system is "out of focus", one or the other of detector elements 116 and 118 will receive a greater amount of light thereby producing a focus error signal indicative of the distance and direction to the focus position.

In FIG. 7, an image 121 of the medium on card 20 is focussed on detectors 122 and 150. The data on the medium is arranged according to the format in FIG. 5b. Four data paths 124, 126, 128 and 130 are present between pairs of adjacent track lines 132 and 134. A large area beam illuminates a large area 136 of the medium including at least portions of tracking lines 132 and 134 and each of the four data tracks 124, 126, 128 and 130 detected by detectors 122 and 150. Although, detectors 122 and 150 are shown as being connected as far as image 121 is concerned, they need not be actually physically connected.

Detectors 122 and 150 are typically multiple element linear arrays of photodiode elements, like detectors 22 and 50 in FIG. 6. Detector 122 comprises a pair of elements 138 and 140 whose signals are subtracted to produce a tracking error signal and four elements or pairs of elements 142, 144, 146 and 148 for reading data tracks 124, 126, 128 and 130 respectively. Detector 150, like detector 50 in FIG. 6, has two detector elements 152 and 154 which produce a focus error signal.

In FIG. 8, an image 161 of the medium on card 20 is focussed on detectors 122 and 150. The data on the medium is arranged according to the format in FIG. 5c and six data paths 170, 172, 174, 176, 178 and 180 may be seen. A large area beam illuminates portions of each of the six data paths detected by detectors 122 and 150.

Detectors 122 and 150 shown are the same as those in FIG. 7, but detectors 22 and 50 in FIG. 6 may also be used. Detectors 122 and 150 are capable of reading more tracks simultaneously than detectors 22 and 50. Detector 122 comprises pairs of elements, such as elements 138 and 140. Four other pairs of elements 142, 144, 146 and 148 are also shown. Each pair of elements reads one of the data paths 170, 172, 174, 176 or 178. Signals from one pair of elements, such as elements 138 and 140, may be subtracted to produce a tracking error signal. Detector 150 has two detector elements 152 and 154 which produce a focus error signal. Other autofocus detectors known in the art may also be used. In this manner, a light beam with a large illumination area is used for both reading data paths, as well as prerecorded information.

What is claimed is:

1. An optical data reading and writing system comprising,
   a first light source comprising a laser capable of emitting a modulated laser beam,
   a second light source emitting a second beam,
   means for directing said laser beam and said wide beam onto an optical data storage medium, said medium having prerecorded information thereon, said laser beam recording data spots of a uniform size, said size less than about ten micrometers, said second beam having a width illuminating a substantially larger area of said medium than said laser beam, and
   means for reading said prerecorded information and said recorded data spots from said area of said medium illuminated by said second beam.

2. The system of claim 1 wherein said second light source is an LED.

3. The system of claim 1 wherein said second light source is a defocussed laser.

4. The system of claim 1 wherein said data spots are aligned in parallel data paths, data spots in a plurality of said paths being illuminated simultaneously by said second beam.

5. The system of claim 4 wherein a plurality of said paths illuminated by said beam are read simultaneously by said reading means.

6. The system of claim 4 wherein said prerecorded information comprises a plurality of parallel track lines, at least one data path being disposed between each adjacent pair of said track lines, said prerecorded information further comprising a plurality of clock spots in said data paths.

7. The system of claim 1 wherein said first and second light sources share a common optical axis.

8. The system of claim 1 wherein said optical data storage medium is a direct-read-after-write medium, said means for reading being in a position following said laser beam for reading recorded data spots.

9. The system of claim 1 wherein said reading means comprises a photodetector receiving light scattered from said illuminated area of said medium, said photodetector having a plurality of detector elements, some of said elements reading prerecorded information, some other of said elements reading data spots.

10. The system of claim 9 wherein said prerecorded information comprises a plurality of parallel track lines, at least one data path having laser recorded data spots being disposed between each adjacent pair of said track lines, said plurality of detector elements of said photodetector being divided into pairs of elements for each track line and each data path.

11. The system of claim 10 further defined by said pair of elements on a track line providing information for servo tracking by a difference between signals from said pair of elements.

12. The system of claim 10 further defined by said pair of elements on a data path providing a data and clocking signal by summation.

13. An optical data card reader-writer comprising,
means for supporting a card having an optical data storage medium disposed thereon, said medium having prerecorded information in spaced apart tracks,
a first light source comprising a laser capable of emitting a modulated laser beam,
a second light source emitting a second beam,
means for directing said laser beam and said wide beam onto said medium, said laser beam recording data spots of a uniform size less than ten micrometers in data paths within said spaced apart tracks, said second beam illuminating a substantially larger area of said medium than said laser beam, and
means for simultaneously reading said prerecorded information and said data spots from said area illuminated by said second beam.

14. The card reader-writer of claim 13 wherein said second light source is an LED.

15. The card reader-writer of claim 14 wherein at least some of said prerecorded information is illuminated along with said data paths, said prerecorded information comprising tracking information.

16. The card reader-writer of claim 13 wherein said second light source is a defocussed laser.

17. The card reader-writer of claim 13 wherein a plurality of said data paths are illuminated simultaneously by said wide beam.

18. The card reader-writer of claim 13 wherein said optical data storage medium is a direct-read-after-write medium, said means for reading being in a position following said laser beam for reading recorded data spots.

19. The card reader-writer of claim 13 wherein said reading means comprises a photodetector positioned to receive light scattered said illuminated area of said card medium, said photodetector having a plurality of detector elements, some of said elements being adapted for reading prerecorded information, some other of said elements reading data spots.

20. The card reader-writer of claim 19 wherein said prerecorded information comprises a plurality of parallel track lines, at least one data path having laser recorded data spots being disposed between each adjacent pair of track lines, said plurality of detector elements being divided into pairs of elements for each track line and each data path.

21. The card reader-writer of claim 20 further defined by said pair of detector elements on a track line providing information for servo tracking by a difference between signals from said pair of elements.

22. The card media-writer of claim 20 further defined by said pair of detector elements on a data path providing a data by summation.

* * * * *